(12) United States Patent
Clark

(10) Patent No.: US 10,875,770 B2
(45) Date of Patent: Dec. 29, 2020

(54) METHOD AND EQUIPMENT FOR COOLING SULPHURIC ACID

(71) Applicant: NC Engenharia Industria E Comercio Ltda, Sao Paulo (BR)

(72) Inventor: Nelson Perella Clark, Sao Paulo (BR)

(73) Assignee: NC Engenharia Industria E Comercio Ltda, Sao Paulo (BR)

( * ) Notice: Subject to any disclaimer, the term of this patent is extended or adjusted under 35 U.S.C. 154(b) by 120 days.

(21) Appl. No.: 16/078,168

(22) PCT Filed: Nov. 7, 2016

(86) PCT No.: PCT/BR2016/050287
§ 371 (c)(1),
(2) Date: Aug. 21, 2018

(87) PCT Pub. No.: WO2017/143416
PCT Pub. Date: Aug. 31, 2017

(65) Prior Publication Data
US 2019/0202694 A1    Jul. 4, 2019

(30) Foreign Application Priority Data

Feb. 22, 2016    (BR) .................. 10 20160036909

(51) Int. Cl.
*C01B 17/80* (2006.01)
*C01B 17/765* (2006.01)
(Continued)

(52) U.S. Cl.
CPC .......... *C01B 17/806* (2013.01); *B01D 53/50* (2013.01); *C01B 17/765* (2013.01); *C01B 17/80* (2013.01);
(Continued)

(58) Field of Classification Search
CPC ....... F28D 1/0026; F28D 1/03; C01B 17/806; C01B 17/48; C01B 17/765
See application file for complete search history.

(56) References Cited

U.S. PATENT DOCUMENTS

| 5,118,490 A | 6/1992 | McAlister |
| 2013/0000869 A1* | 1/2013 | Daum ..................... F01K 17/06 |
| | | 165/104.25 |

FOREIGN PATENT DOCUMENTS

| DE | 102010006541 | 9/2011 |
| DE | 202015106813 | 1/2016 |
| WO | 9114651 | 10/1991 |

* cited by examiner

*Primary Examiner* — Elizabeth J Martin
(74) *Attorney, Agent, or Firm* — Gable Gotwals

(57) ABSTRACT

A method and system for cooling sulfuric acid aqueous solutions (H₂SO₄) belonging to the field of chemical processes, which is part of a contact process for production of sulfuric acid with or without energy recovery. The method comprises absorption of SO₃, which produces heated concentrated sulfuric acid and indirectly cooling the hot acid. The method uses a sulfuric acid-inert coolant. A cooling step comprises an intermediate indirect acid-fluid cooling and a second fluid-water or fluid indirect cooling step—third fluid, wherein when the process is of the type with energy recovery. A third step includes energy recovery, steam generation. A system to perform the method, which works next to the SO₃ absorption tower comprises an acid cooling loop consisting of an intermediate acid-fluid heat exchanger; a second fluid-water heat exchanger, and when the process is of the type with energy recovery, said equipment further includes a steam generation boiler.

11 Claims, 11 Drawing Sheets

(51) Int. Cl.
*B01D 53/50* (2006.01)
*F28D 1/02* (2006.01)
*F28D 1/03* (2006.01)
*F28D 21/00* (2006.01)

(52) U.S. Cl.
CPC ............ *F28D 1/0226* (2013.01); *F28D 1/03* (2013.01); *F28D 2021/0022* (2013.01); *Y02P 20/124* (2015.11); *Y02P 20/57* (2015.11)

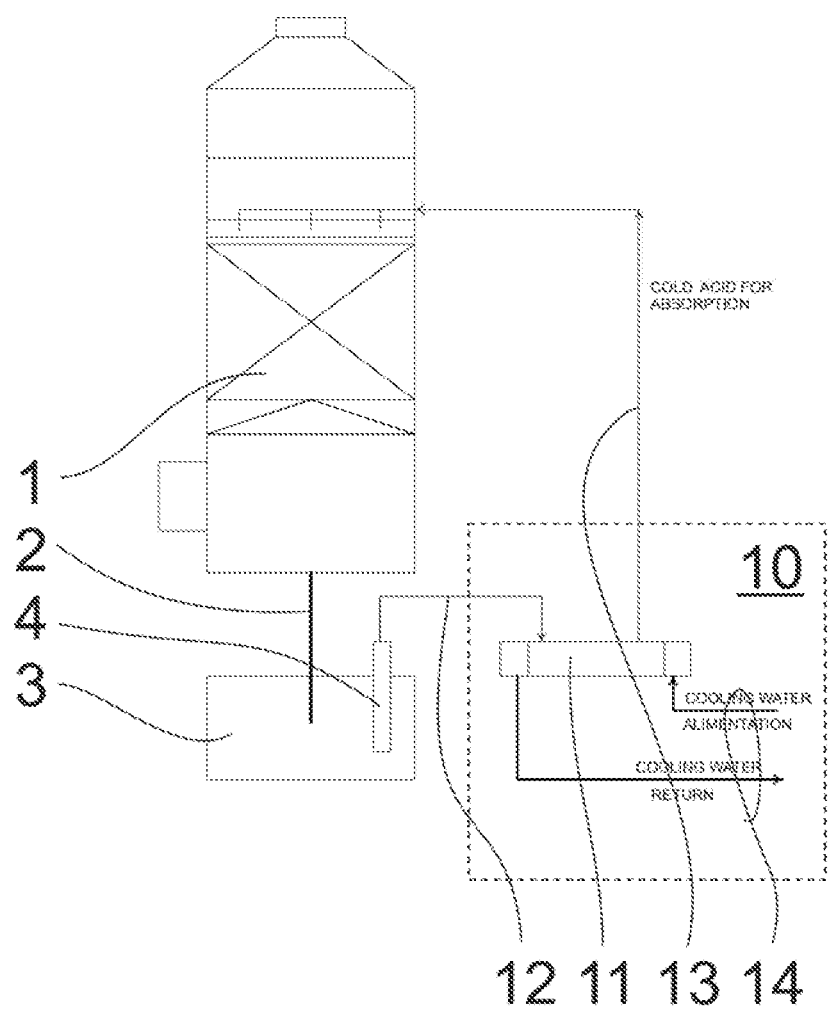
FIG. 1
(CONVENTIONAL)

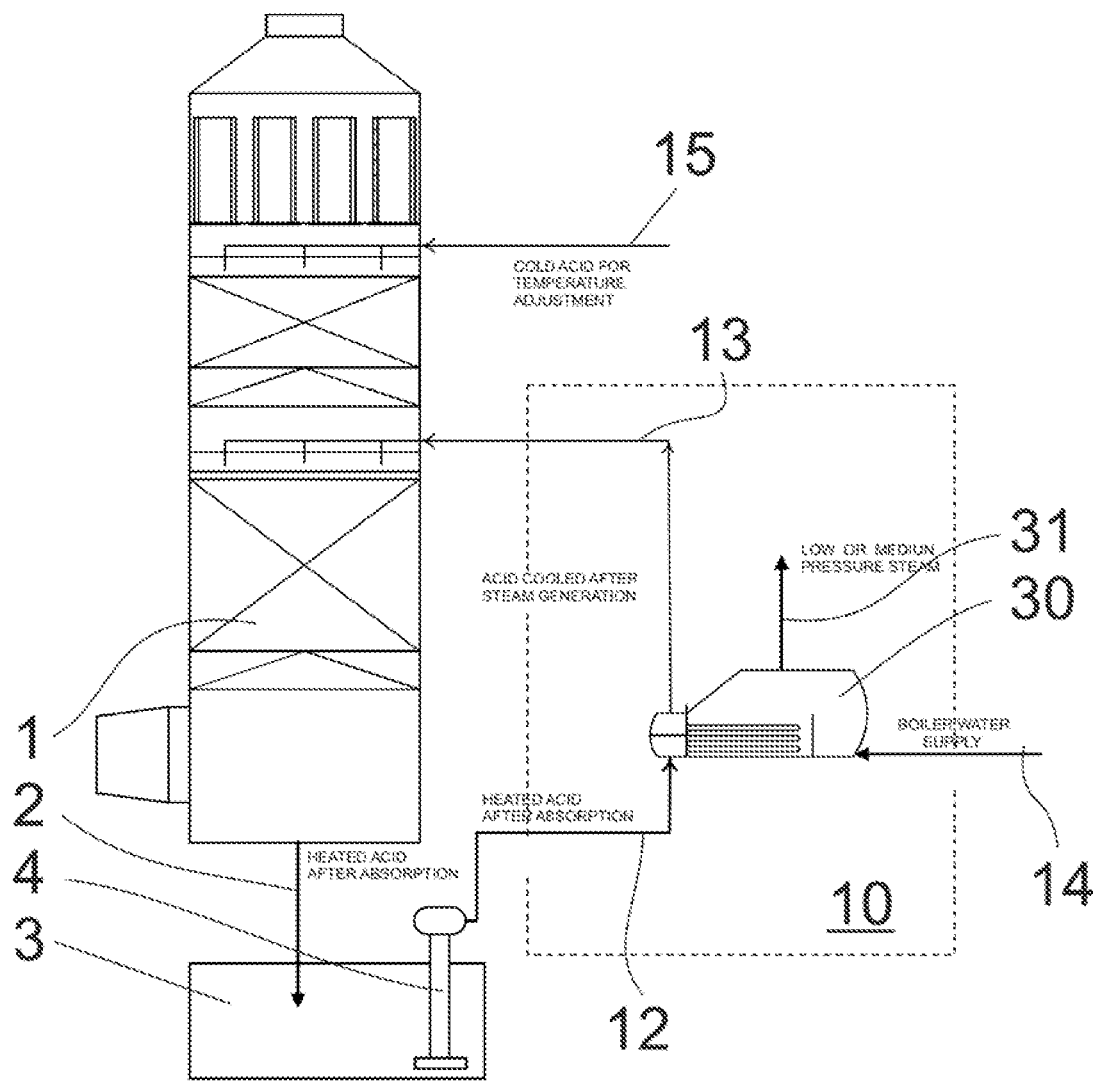
FIG. 3
(CONVENTIONAL)

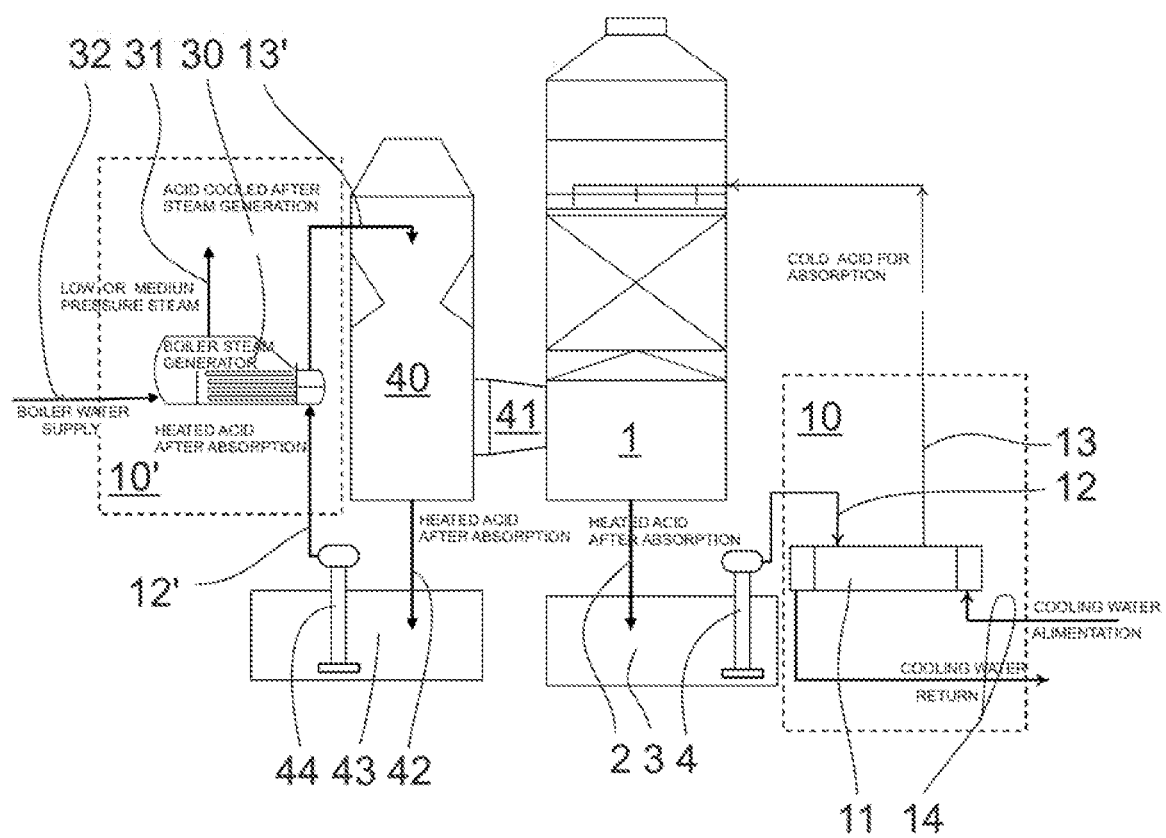
FIG. 4
(CONVENTIONAL)

METHOD AND EQUIPMENT FOR COOLING SULPHURIC ACID

CROSS-REFERENCE TO RELATED APPLICATIONS

This United States application is the National Phase of PCT Application No. PCT/BR2016/050287 filed 7 Nov. 2017, which claims priority to Brazilian Patent Application No. 10 2016 003690 0 filed 22 Feb. 2016, each of which is incorporated herein by reference.

BACKGROUND OF THE INVENTION

Introduction

This specification relates to an application for patent of invention for a method and equipment for cooling aqueous sulfuric acid solutions belonging to the field of chemical processes, which have been developed to provide more safety when cooling acid, for applications in processes with and without energy recovery and providing multiple embodiments to fit different plants for the manufacture of sulfuric acid by contact process.

STATE-OF-THE-ART

One of the stages of sulfuric acid ($H_2SO_4$) production by contact process is the absorption of $SO_3$ (sulfur trioxide) obtained by means of a stream of concentrated aqueous sulfuric acid solutions (sulfuric acid) in a column or liquid gas contact device such that the product from such reaction is an more concentrated sulfuric acid, which will be later diluted in concentrations for use in a process and/or for sale purposes.

The reaction of $SO_3$ with the concentrated sulfuric acid stream actually occurs between $SO_3$ in the gaseous stream and the residual water $H_2O$ present in the liquid acid stream put in contact with the gas. This is represented in a more simplified manner by the following formulas:

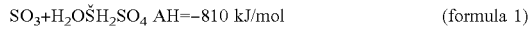

$$SO_3 + H_2O \text{Š} H_2SO_4 \quad \Delta H = -810 \text{ kJ/mol} \quad \text{(formula 1)}$$

This reaction is highly exothermic and releases a substantial amount of energy, which concentrates and heats the acid stream used in the absorption/reaction process such that the even more concentrated acid stream exiting the process is also hotter.

This energy (heating) needs to be removed from the system in order to keep the process parameters under control, and so that the absorption takes place within the designed and desired temperature and concentration ranges.

Cooling the hot acid flowing from the $SO_3$ absorption processes is indirectly made with the use of shell and tube heat exchangers, or plate heat exchangers or even metal spiral, cast iron, stainless steel heat exchangers with or without anodic protection or special alloy heat exchangers, depending on specific process conditions. What all of these systems have in common is that they use water as coolant. Using water as coolant has great benefits, such as the achievement of high heat transfer coefficients, the abundance and low cost of the input or the possibility of generating low or medium pressure steam directly through the acid cooling process.

On the other hand, however, a potential leak of water to the acid loop or from this latter to the water loop will necessarily cause the production of hot diluted sulfuric acid, since the reaction between the acid and the water, as previously mentioned, is very exothermic. Generating diluted sulfuric acid can in turn accelerate or lead to a process of accelerated corrosion of the heat exchangers, tubings or other devices, thus destroying all or part of the equipment and resulting in huge costs associated with the plant downtime for maintenance and damage repair.

Even worse, the reaction between sulfuric acid and iron and other metal elements from which the heat exchangers are made produces hydrogen, which in gaseous state, depending on the magnitude and speed of the corrosive process, may build up and later lead to explosions. The subject matter is quite serious and discussed in many studies and international forums. There are many recent reports on explosions caused by hydrogen in the worldwide sulfuric acid industry.

Objects of the Invention

The object of this invention is to provide a method and equipment to enable operators of sulfuric acid manufacturing plants to obtain additional benefits specifically from the sulfuric acid cooling stage performed just after the $SO_3$ absorption stage.

Another object is to provide a method and equipment for cooling sulfuric acid, which are flexible to provide several application variants.

Another object is to provide a method and equipment for cooling sulfuric acid, which are flexible to be applied to acid manufacturing processes with no energy recovery or acid manufacturing processes with energy recovery for application in the acid manufacturing process or other adjacent processes or also in the generation of electric power or other means of energy recovery.

Another objective is to provide a method and equipment for cooling sulfuric acid, which reduce or minimize the risk of corrosion of the equipment and materials in case of a leak, and thus reduce or minimize the risk of hydrogen formation and its consequences.

BRIEF DESCRIPTION OF THE INVENTION

In view of the above-mentioned difficulties and drawbacks of the prior art, and in order to overcome and meet the related objectives of the invention, the method and equipment for cooling sulfuric acid object of this patent have been designed to comprise, instead of cooling the hot sulfuric acid effluent from the absorption reactions with water, as usually happens, cooling it down with coolants that are inert to sulfuric acid, such as perfluorocarbons fluids, C5-C29 chain fluorinated fluorohydrocarbons, such as, for example, hydrofluoroethers or perfluoropolyethers or mixtures thereof, such that in a first step, the sulfuric acid is cooled by indirectly transferring heat to this fluid and in a second step, such fluid indirectly exchanges heat with the water or any other coolant, is cooled and reused, wherein such method can be used for simply cooling sulfuric acid, or additionally for producing low, medium or high pressure steam or for heating other process streams, whether from the acid manufacturing plant or adjacent industrial plants or processes.

This embodiment of the method and equipment has several advantages that will become apparent from the following description based on the figures that illustrate the invention.

FIGURES ILLUSTRATING THE INVENTION

The attached drawings relate to the method and equipment for cooling sulfuric acid object of the present patent, in which:

FIG. 1 shows a scheme of a conventional indirect sulfuric acid cooling system without energy recovery, steam generation;

FIG. 3 shows a scheme of a conventional indirect sulfuric acid cooling system with energy recovery, steam generation;

FIG. 4 shows a scheme of a conventional redundant sulfuric acid cooling system with energy recovery, steam generation;

Figure 8:
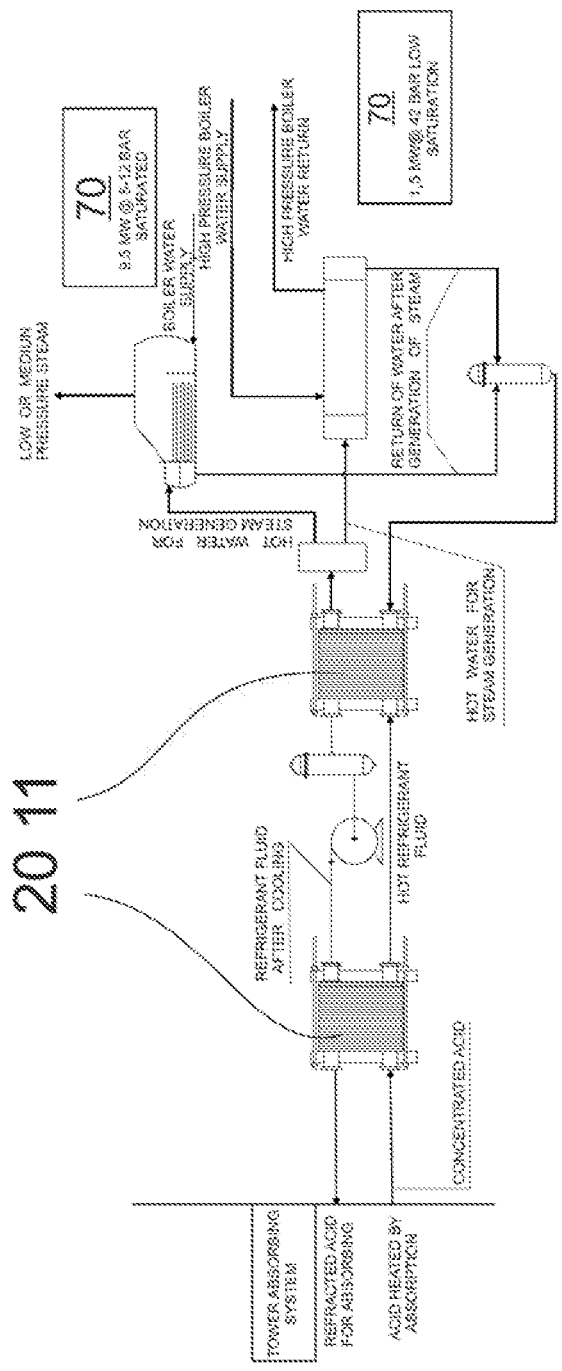
Figure 8A:
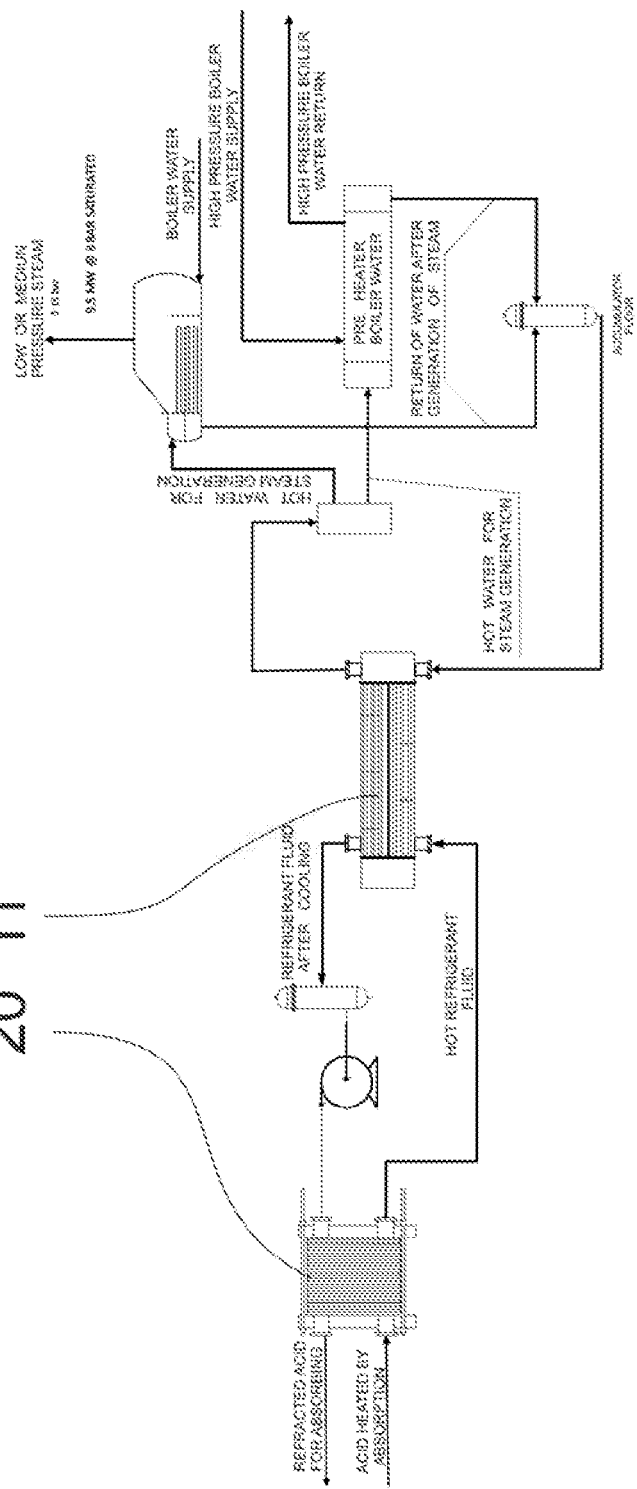
Figure 9:
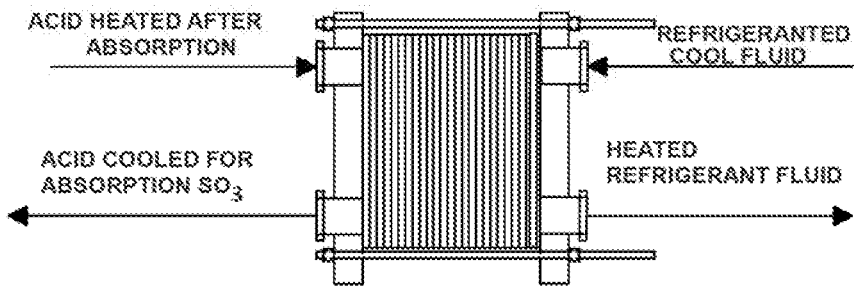
Figure 10:
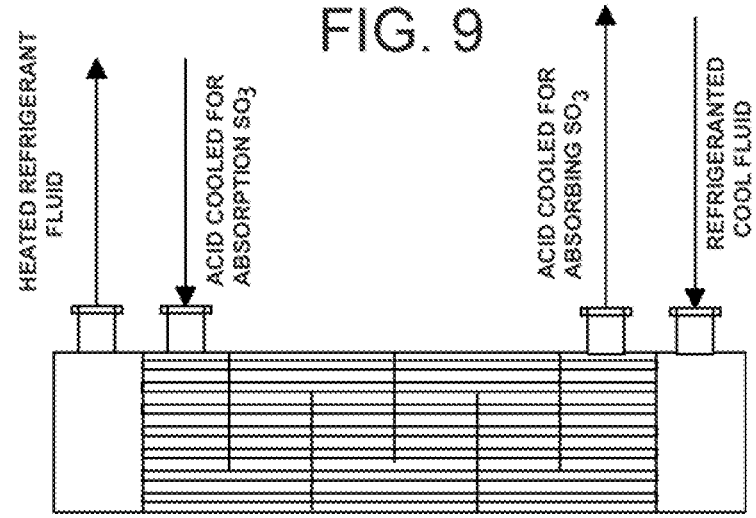
Figure 11:
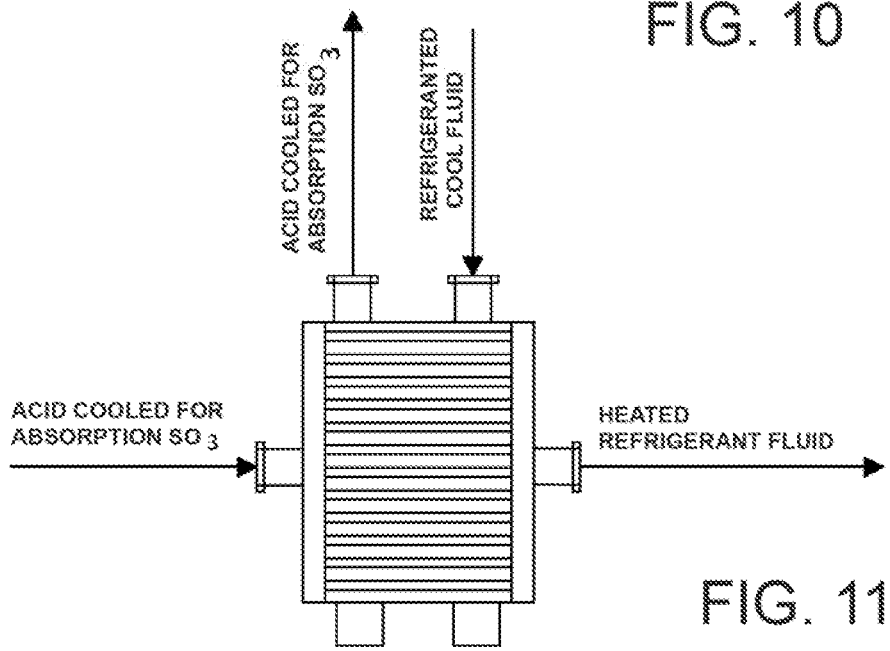

FIG. 8 shows a system with an intermediate heat exchanger that heats more than one user with approximate values for a sulfuric acid production plant with an approximate capacity of 1000 t/day, according to the invention with a plate heat exchanger and FIG. 8A shows one embodiment with a plate, and a shell and tube heat exchanger; and FIGS. 9-11 schematically show choices of heat exchangers, i.e. plate, shell and tube and spiral, respectively, used in the equipment of the invention for cooling both the coolant and the acid.

DETAILED DESCRIPTION BASED ON THE DRAWINGS

As provided in the invention, the method and equipment object of this patent are part of the contact process for production of sulfuric acid ($H_2SO_4$) with or without energy recovery.

Thus, said contact process for the production of sulfuric acid without energy recovery typically comprises the following steps among others (FIG. 1):

1—Absorption of $SO_3$ (sulfur trioxide) by means of a stream of concentrated sulfuric acid solution through one or more columns or one or more liquid-gas contact devices, which produce heated concentrated sulfuric acid as effluent; and 2—Cooling the hot acid effluent from the $SO_3$ absorption step indirectly made with heat exchangers that typically use cooling water as fluid for thermal exchange.

Where the process for producing sulfuric acid ($H_2SO_4$) by the usual contact process is of the type with energy recovery (FIGS. 3, 4) the following is further an integral part thereof:

Step 3—energy recovery, steam generation for use in the process for manufacturing sulfuric acid or in other adjacent processes or electric power generation or others.

These usual processes when of the type without energy recovery are performed with the equipment schematically illustrated in FIG. 1, and when they are of the type with energy recovery, the equipment is as schematically illustrated in FIGS. 3, 4.

The above-described and illustrated prior art processes and equipment serve their purposes, but have the drawbacks described in more detail later throughout this specification.

The method and equipment of this invention (FIGS. 2, 5-8) are intended to cool sulfuric acid with shell and tube, plate or spiral type heat exchangers or the like, with or without energy recovery, in order to overcome the drawbacks of the prior art.

For such purpose, step 2—Indirect cooling, according to the method of the present invention, instead of using cooling water as usually occurs, uses fluids such as perfluorocarbons or fluorinated hydrocarbons with chains of 5 or more carbon atoms, such as for example hydrofluoroethers or perfluoropolyethers or mixtures thereof or the like. The choice of the most suitable fluorinated fluid is mainly subject to the hot acid temperatures, once shorter chains have more favorable yet more volatile heat transfer characteristics while longer chains are less effective but less volatile in terms of heat transfer.

Yet, said Step 2—indirect cooling, according to the present invention comprises:

Intermediate indirect cooling of sulfuric acid with an inert coolant, performed by a heat exchanger located in the acid outlet of the $SO_3$ absorption step, which provides indirect heat exchange between the heated sulfuric acid and the coolant through a plate, shell and tube, spiral or another type of heat exchanger, thus generating cooled sulfuric acid that is recirculated to the $SO_3$ absorption step, and the inert coolant to the heated sulfuric acid; and A second step providing the indirect cooling of the heated coolant with cooling water or another fluid (third fluid), which provides indirect heat exchange between the heated coolant and water or another fluid by using a plate, shell and tube, spiral or another type of heat exchanger, thus generating a coolant that is inert to the cooled sulfuric acid that is recirculated and water or another heated fluid, which may be reused in the process or in other adjacent processes.

In case of a sulfuric acid manufacturing process of the type with energy recovery, steam generation, it further comprises step 3)—Energy recovery, steam generation, which generates heated water/steam that may be used in the process for manufacturing sulfuric acid or in other adjacent processes or in the generation of electric power or others.

The above description approaches the spirit of the subject matter of the invention and the description below is intended to provide more details about the subject matter.

Thus, the following are components of a conventional sulfuric acid production plant, among others: a $SO_3$ absorption tower 1 (FIG. 1), its outlet 2 through which the heated concentrated sulfuric acid effluent circulates; the concentrated sulfuric acid circulation tank 3 and pump 4. In case of a sulfuric acid manufacturing process of the non-energy recovery type, (FIG. 1) there is provided an acid cooling loop 10 comprising an acid-water heat exchanger 11 of the type using cooling water, which indirectly exchanges heat with the heated concentrated acid from the $SO_3$ absorption tower 1; a feeding tube 12 deriving from pump 4, and which feeds sulfuric acid to the heat exchanger 11; a sulfuric acid recirculation tubing 13 at a concentration of 97.0 to 99.5% and a temperature of 70 to 90° C. for the $SO_3$ absorption tower 1; return and water supply tubing 14 to the heat exchanger 11, among others.

However, concentrated sulfuric acid is corrosive and a corrosion process able to put it in contact with water, whether due to corrosion of metal materials or production flaws, will produce hot diluted sulfuric acid, i.e. even more corrosive than the concentrated acid. This corrosion may damage or destroy the equipment and tubings among others, lead the plant to a downtime for hours or even days, and further lead to the generation of hydrogen, which in turn can cause an explosion.

Figure 2:
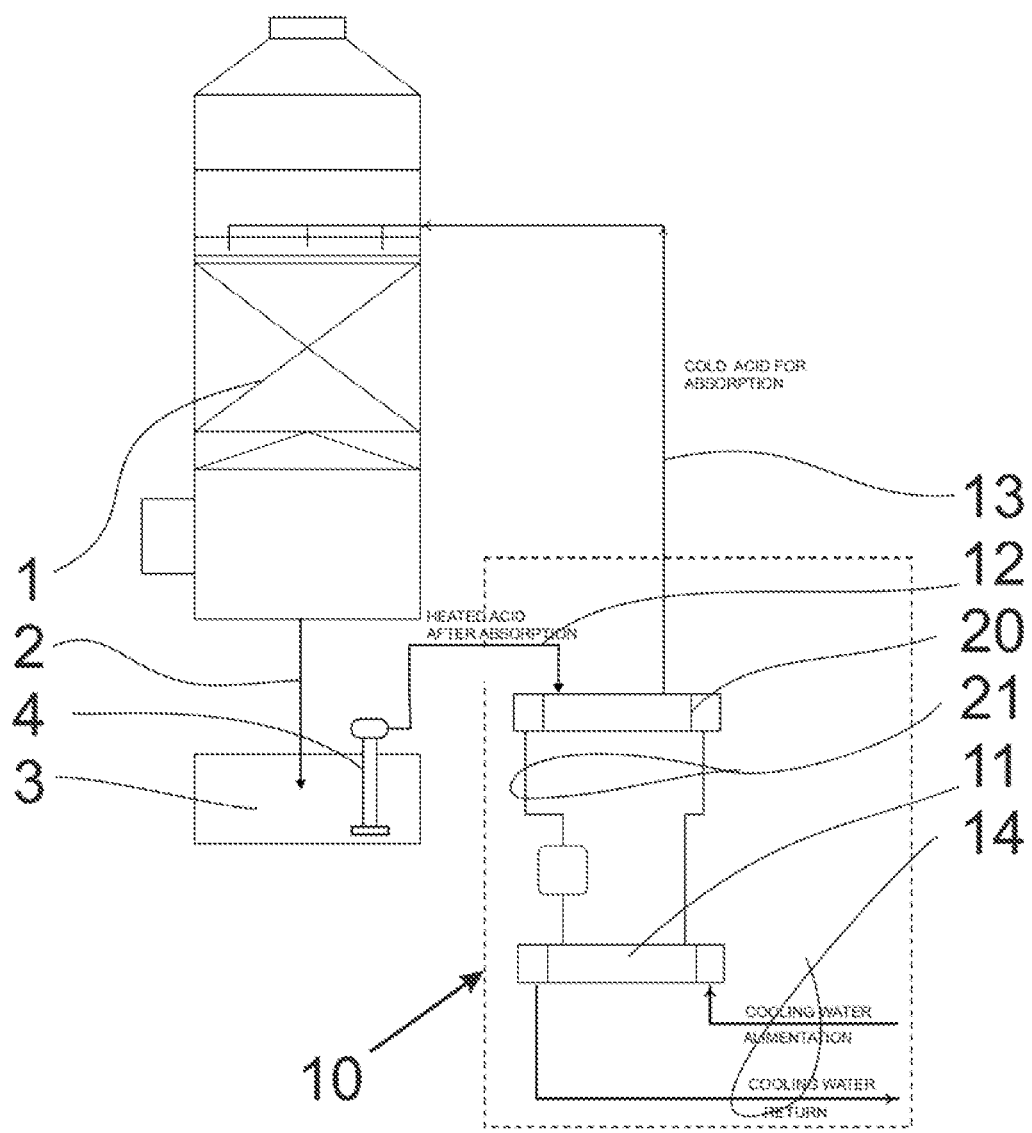
FIG. 2 shows a scheme of indirect sulfuric acid cooling system without energy recovery, steam generation, according to this invention, which uses an inert coolant and intermediate acid-fluid heat exchanger.

In order to overcome this drawback, the above-mentioned method object of the present invention (which uses a coolant inert to sulfuric acid; an intermediate step for cooling the heated acid-coolant; a second step for cooling the heated coolant-water/other fluid) has been designed, wherein, when a non-energy recovery process is performed by a device as shown in FIG. 2, which uses an inert coolant and an acid cooling loop 10 provided with an intermediate heat exchanger, said exchanger can be a plate, shell and tube, spiral heat exchanger or another type of indirect contact, acid-coolant heat exchanger.

Thus, in the present invention, the acid cooling loop 10 (FIG. 2) comprises an intermediate acid-fluid (plates, shell and tubes, spiral or another) heat exchanger 20, which cools the heated concentrated sulfuric acid by thermal exchange with the inert coolant; a second fluid-water heat exchanger 11, which receives and cools the inert heated coolant by thermal exchange with cooling water; a feeding tube 12, which establishes a fluid connection between the pump 4 and the heat exchanger 20, and feeds said sulfuric acid at a temperature of 70 to 120° C. and a concentration of 98 to 101% after absorption of $SO_3$ in the absorption tower 1; cooled sulfuric acid recirculation tubing 13 at a temperature of 70 to 120° C. and a concentration of 97.0 to 99.5% for the $SO_3$ absorption tower 1; tubing 21 for reuse of the inert coolant, which establishes a fluid connection between the intermediate acid-fluid heat exchanger 20 and the second fluid-water/other fluid heat exchanger 11, and substantially comprising a tubing, an accumulation vessel and a recirculation pump; return and water supply tubing 14 for a second fluid-water heat exchanger 11 among others.

This new embodiment is naturally more complex. However, benefits achievable far outweigh the greater complexity of the installation.

In fact, with the new construction of the equipment there is no water-acid interface, but rather an inert sulfuric acid-coolant interface. Thus, when the sulfuric acid loop leaks into the coolant loop, the acid does not dilute, and causes no acceleration of the exchanger corrosion or energy release. This leakage can be easily identified in the coolant line by measurement of pH or conductivity or even drainage of the coolant circulation line if its pressure is lower than the pressure of the acid system, or by the reduction of the volume of coolant in the system if the operating pressure of the coolant is lower than that of the sulfuric acid.

The fact that the leakage produces no diluted acid nor increases the temperature of the acid by the dilution heat effect, it reduces the rate of expansion of the hole through which the acid leaks. Thus, the problem grows more slowly, allowing the plant operator to gain time to prepare for the shutdown or even to operate the plant for prolonged periods by monitoring the evolution of the rate of growth of the hole/leakage, something unthinkable in an acid-water system.

Since the leakage does not self-catalyze the corrosion of the equipment, it reduces the damage caused to it, reducing the cost of maintenance while extending the life of the equipment.

In a situation of a potential leakage from the acid loop to the coolant loop, no hydrogen is released because the non-production of diluted acid does not accelerate the equipment corrosion and suppresses the generation of hydrogen and the risk of explosion.

Using plate heat exchangers in the indirect cooling system of the water-concentrated acid has been avoided in designs of most sulfuric acid manufacturing units because the plates have thin walls, and for this reason the potential leak can be disastrous for the unit.

On the other hand, the system that uses a coolant either reduces the risk of a leakage in a plate heat exchanger or prevents it from destroying the heat exchanger because there is no water for diluting the acid, and thus it catalyzes its corrosiveness, avoiding the equipment destruction. Thus, units featuring plate heat exchangers and spiral heat exchangers have an additional benefit when used with an intermediate loop with inert coolant compared to the plate or spiral heat exchangers set up in conventional systems.

However, in addition to conventional units that absorb $SO_3$ at temperatures that may vary from 70 to 120° C. with no energy recovery, as shown in FIG. 1, units having energy recovery, as shown in FIGS. 3, 4, have become increasingly popular.

The acid used for absorption in such units can be at temperatures varying from 100 to 240° C. and a concentration that may vary from 97% to 101%. The acid cooling in this type of system, instead of being made with acid-water heat exchangers, is made in boilers. As the hot acid cools down, the boilers produce low or medium pressure water steam, depending on the temperature of the acid used to absorb $SO_3$ and that is being cooled. One of the first systems for recovering the energy produced during absorption of the hot acid has been designed by Monsanto Enviro-Chem Systems Inc. (U.S. Pat. Nos. 4,576,813, 4,670,242, 4,996,038, 8,586,001, WIPO Patent Application WO/2014/144699).

A typical unit of this kind comprises: (FIG. 3) a single or double stage absorption tower assembly 1, which absorbs $SO_3$ from the gases of the process with sulfuric acid at concentrations of 98-101% and temperatures above 120° C.; an acid outlet 2 after absorption, through which the heated acid circulates at a temperature between 120 and 240° C.; an acid circulation tank 3 and pump 4.

The unit further comprises a cooling and energy recovery, steam generation loop 10, comprising a steam generation boiler 30 that cools the acid and produces low or medium pressure steam; a feeding tube 12, which establishes a fluid connection between the pump 4 and the boiler 30 through which the heated acid circulates after absorption at a temperature between 120 and 240° C., and a concentration between 97 and 101%; recirculation tubing 13 that connects the boiler outlet 30 to the $SO_3$ absorption tower 1, through which the cooled acid circulates at a temperature between 100 and 240° C., and a concentration between 97 and 101%; water supply tubing 14 in the boiler at a pressure between 300 to 3000 kPa; tubing 31 for the escape of low or medium pressure (300 to 1500 kPa) from the boiler 30. The plant further provides a cold acid feeding tube 15 for temperature adjustment in tower 1, which feeds acid at a concentration between 97 and 101% and a temperature between 70 and 120° C. All components of the system, tower, boiler, tanks, tubings are typically built from (noble) metal material specially selected to resist corrosion in sulfuric acid medium under the operating conditions.

This system designed by Monsanto Enviro-Chem Systems, Inc. gives the plant operator huge advantages. The production of low or medium pressure steam in the boiler 30 significantly increases the generation of energy by the sulfuric acid plant; there is simultaneously a reduction in cooling water consumption since heat from $SO_3$ absorption, which in some cases is accountable for more than 35% of the total energy generated by the plant, may be used for heating other equipment or systems and/or for the generation of electricity.

However, the main drawback of this system is the risk of corrosion and downtime of the unit, particularly in case of a failure of the boiler 30. In such situation, the saturated water/steam can come in contact with the acid, and precisely because they are pressurized, they may cause a very fast dilution of the acid—at a much higher speed than that at which it would occur should the fluids be at a closer pressure—with the consequent accelerated increase in temperature. In this case, the diluted acid produced is extremely corrosive, is at a very high temperature and may destroy the entire system in just a few hours. Such system leakage can be catastrophic if not repaired in a few minutes or hours. Also, a failure of this nature in the boiler will withdraw the entire unit from service, since the plant cannot be operated in another way unless with energy recovery.

An alternative to prevent a failure in the steam generation boiler from leading to a full shutdown of the acid production unit has been proposed by Outotec/Lurgi. According to such system, the absorption of $SO_3$ with hot acid (100-240° C. and 98-101%) is made (FIG. 4) in a separated vessel 40 (typically a venturi scrubber) mounted upstream the $SO_3$ absorption tower 1, which in turn operates by absorbing $SO_3$ eventually not absorbed in the first vessel using acid at the usual process temperatures in a range of 70-120° C., and concentrations about 97-99.5%, wherein such solution includes an acid cooling loop 10 comprising an acid-water heat exchanger 11 associated with the outlet of the $SO_3$ absorption tower 1 and a steam cooling and generation loop 10' comprising an acid-water steam generation boiler 30 associated with the outlet of the vessel 40.

The advantage of this system is that in the event of a failure in the boiler 30, the absorption tower loop 1 can typically perform the entire absorption of $SO_3$, preventing the plant from stopping due to a failure in the generation circulation and energy recovery system. The key objective of the plant, i.e. to produce acid, is thus preserved in case of a failure of the energy recovery/steam generation system.

Of course, redundancy in this system dramatically increases the installation cost while increasing reliability as well. An exemplary embodiment of this option is shown in FIG. 4.

In this case, the equipment substantially comprises an absorption tower assembly consisting of $SO_3$ absorption tower 1; tower outlet 2 for the heated acid after absorption at 70 to 120° C.; acid circulation tank 3 and pump 4; additionally, said equipment comprises a $SO_3$ absorption vessel assembly connected upstream with the $SO_3$ absorption tower 1 comprising $SO_3$ absorption equipment (venturi scrubber), connection thereof 41 with the tower 1, outlet 42 of the vessel through which the heated acid circulates after absorption at a concentration of 98% to 101% and temperature of 100 to 240° C.; acid circulation tank 43 and pump 44.

The equipment further comprises an acid-water cooling loop 10 associated with tower 1 consisting of an acid-water heat exchanger 11; acid feed tubing 12 that connects the heat exchanger 11 with the pump 4; recirculation tubing 13 that connects the heat exchanger 11 with the tower 1, through which the cooled acid circulates for absorption at a concentration of 97 to 99.5%, and temperature between 70 and 120° C.; and the cooling water supply and return tubing 14 from the heat exchanger 11. Said equipment further comprises a cooling and energy recovery loop 10' associated with the vessel 40, and consisting of a steam generation boiler 30; tubing 12' for connecting the pump 44 with the boiler 30 through which the acid circulates after absorption at a temperature between 100 and 240° C.; the acid recirculation tubing 13' between the boiler 30 and the vessel 40, through which the cooled acid circulates after steam generation between 100 and 240° C.; tubing 14' for supplying water to the boiler at a pressure between 300 to 3000 kPa; the boiler steam outlet tubing 31 through which the low or medium pressure, 300 to 3000 kPa, steam circulates and that may be associated, for example, with an electricity generation turbine (not shown) or other.

A curious aspect about the conventional energy recovery systems like the one described above is that the boiler, no matter at which temperature or pressure it operates, needs to produce steam at a temperature/pressure substantially lower than those of the steam that would be at the same temperature as the cooled acid. This because there must be a substantial difference of temperature between the acid and the steam in order the thermal exchange area of the boiler can be enhanced. One could work by generating steam at a higher temperature and pressure provided the area could be substantially increased. However, since the equipment is extremely expensive due to its construction materials, the quality of the energy recovered must enable keeping the cost of the equipment at an acceptable level.

Thus, for example, a conventional energy recovery unit typically cools, for example, sulfuric acid at a concentration of 99.5% and temperature of 220° C. until, for example, a temperature of 200° C. Typically, however, the pressures of the steam generated in the boiler of this system do not exceed 1000-1200 kPa at a saturation temperature of 170-180° C., therefore, 40° C. below the temperature of the hottest acid and 20° C. below that of the coolest acid.

The above-described two examples of conventional sulfuric acid cooling systems with energy recovery (FIGS. 3, 4) have an acid-water interface that causes the problems already discussed herein.

In order to overcome these problems, the method and equipment object of the present patent also have constructions to cool sulfuric acid and recover energy, and generate steam, as shown in FIGS. 5-8.

Thus, according to one embodiment of the apparatus of the present invention (FIG. 5) for cooling sulfuric acid and recovering energy (which uses an inert coolant; the intermediate acid-fluid cooling step; a second fluid-water cooling step; and an energy recovery step) allows the cooling steps to be performed by shell and tube, plate or spiral heat exchangers and energy recovery, steam generation in the boiler for steam generation.

A plant of this type comprises: single or double stage $SO_3$ absorption tower 1; an outlet 2 through which the heated acid circulates after absorption at a temperature between 100 and 240° C.; acid circulation tank 3 and pump 4. An acid cooling loop 10 is also part of the plant comprising an intermediate acid-fluid heat exchanger 20; a second fluid-water heat exchanger 11, both plate (FIG. 5) or shell and tube (FIG. 5A) or spiral heat exchangers; a feeding tube 12 that establishes a fluid connection between the pump 4 and the intermediate acid-fluid heat exchanger 20, through which the heated acid circulates after absorption at a temperature between 100 and 240° C., and a concentration between 98 and 101%; a cooled acid recirculation tubing 13 between the intermediate acid-fluid heat exchanger 20 and single or double stage $SO_3$ absorption tower 1 through which the cooled acid circulates after absorption at a concentration between 98 and 101%, and a temperature between 100 and 240° C.; inert coolant reuse tubing 21, which establishes a fluid connection between the intermediate acid-fluid heat exchanger 20 and the second fluid-water heat exchanger 11, and substantially comprising a tubing, an accumulation vessel and a recirculation pump, through which the heated and cooled fluid circulates. The unit further comprises a cooling and energy recovery, steam generation loop 10' comprising a steam generation boiler 30; a feed and return tubing 14 between the second heat exchanger 11 and the boiler 30; a tubing 31 for supplying water to the boiler at a pressure between 300 to 3500 kPa; a low or medium pressure (between 300 to 3500 kPa) steam feeding tube 32, which exits the boiler 30 and can feed any system. The plant further comprises a cold acid feeding tube 15 for temperature adjustment in tower 1, which feeds acid at a concentration between 98 and 101% and a temperature between 70 and 120° C.

Figure 5:
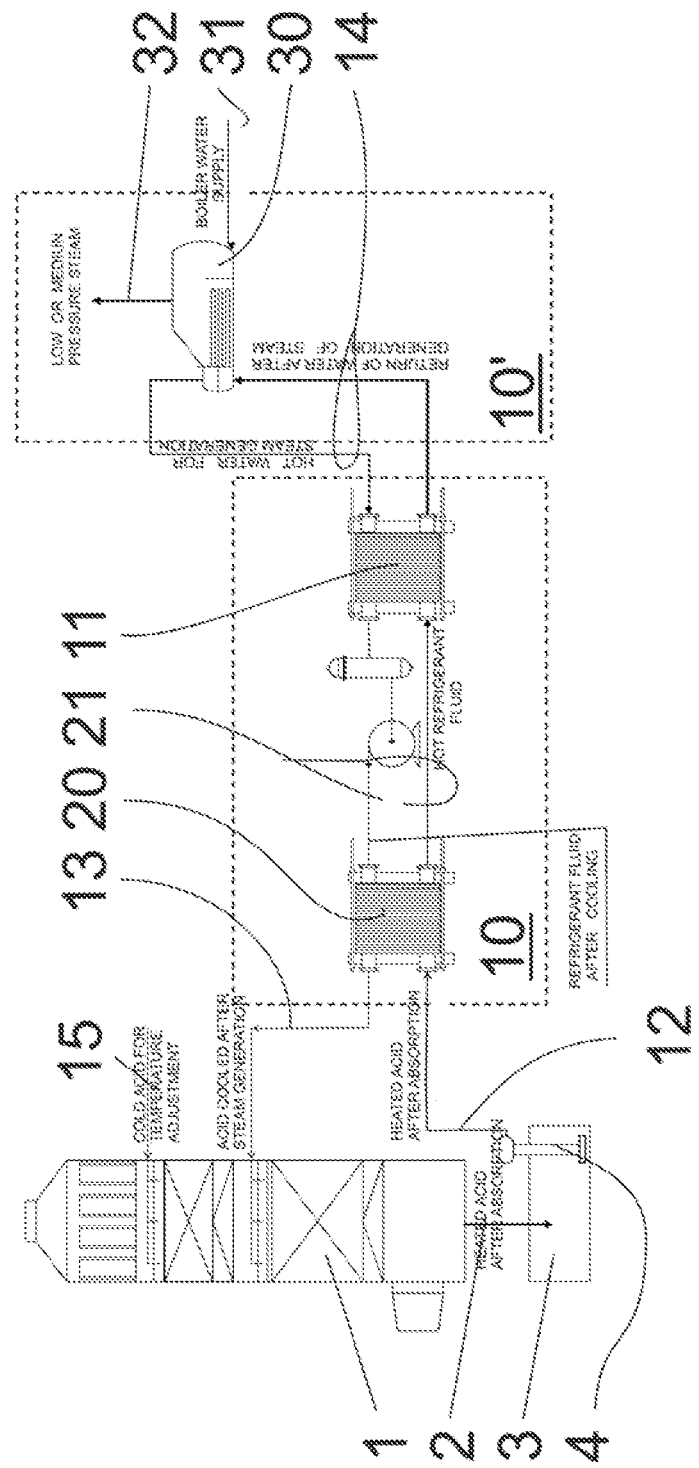
FIG. 5 shows a scheme of one embodiment of the indirect sulfuric acid cooling system with energy recovery, steam generation, which uses an inert coolant, intermediate heat exchanger and boiler, according to the invention with plate heat exchangers
Figure 5A:
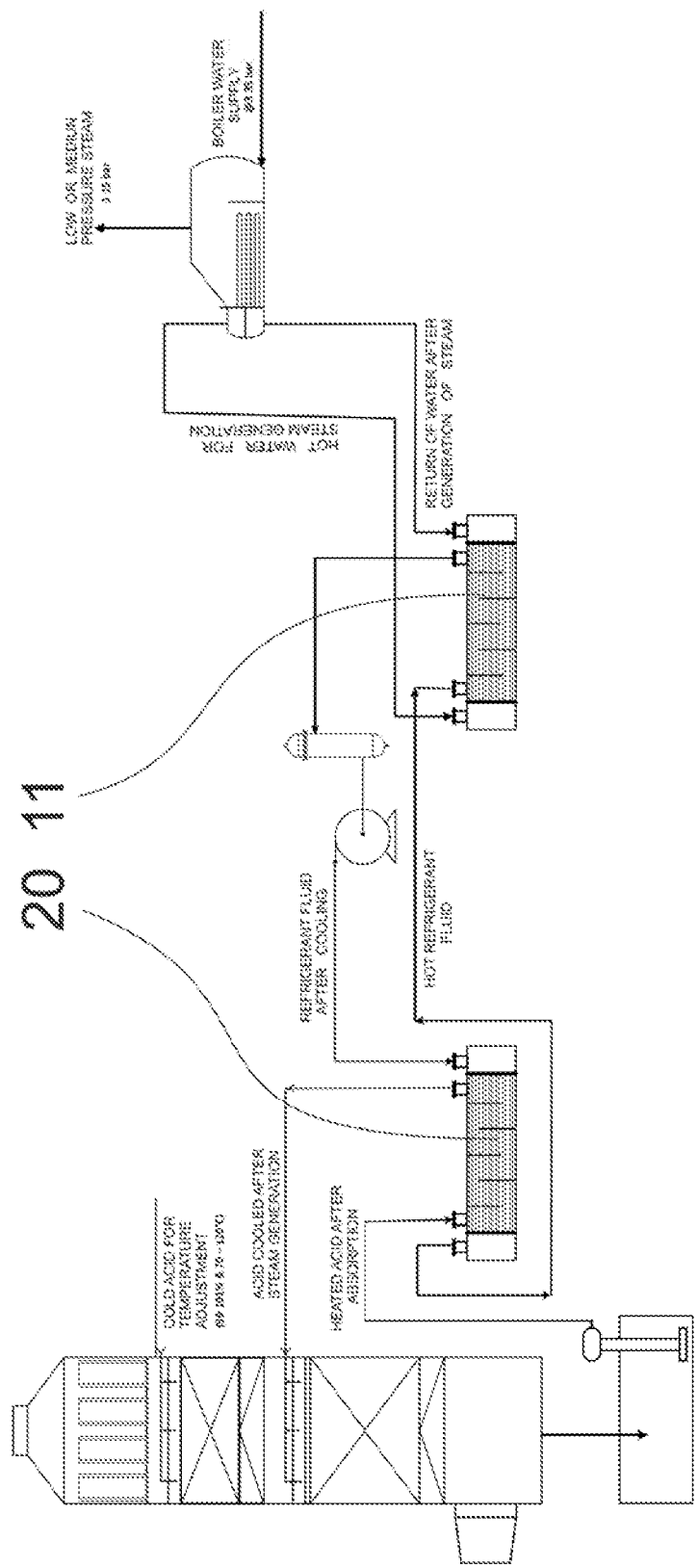
FIG. 5A shows one embodiment with shell and tube exchangers.

Thus, the energy recovery system shown in FIG. 5 uses an intermediate acid-coolant plate heat exchanger 20 to cool the hot acid; a second coolant-water heat exchanger 11 to cool the coolant and heat the steam generation medium and a boiler 30, which uses the water from the second heat exchanger 11 to generate steam. This system offers a number of benefits.

Thus, the intermediate heat exchanger 20 that cools the hot acid with an inert coolant may operate with the coolant loop at a pressure lower than that of the acid (unlike conventional systems in which the water/steam is at a higher pressure than the acid).

Thus, any leakage eventually occurring will be from the acid side to the inert coolant side. This leakage may be detected in an expansion tank (not shown) suitably associated with the system wherein the acid separates from the fluid by gravity. Likewise, a conductivity meter or pH instrument (not shown) can easily detect the leakage. Since there is no acid dilution in the event of a leakage, there is also no accelerated corrosion or hydrogen generation by the formation of hot diluted acid.

Another interesting aspect of this invention relates to the quality of the steam recovered. The heat exchanger 20 of the acid cooling loop used in the present invention can be a high heat transfer plate, shell and tube or spiral heat exchanger and therefore, one may seek to bring the temperature of the coolant closer to that of the acid.

Figure 6:
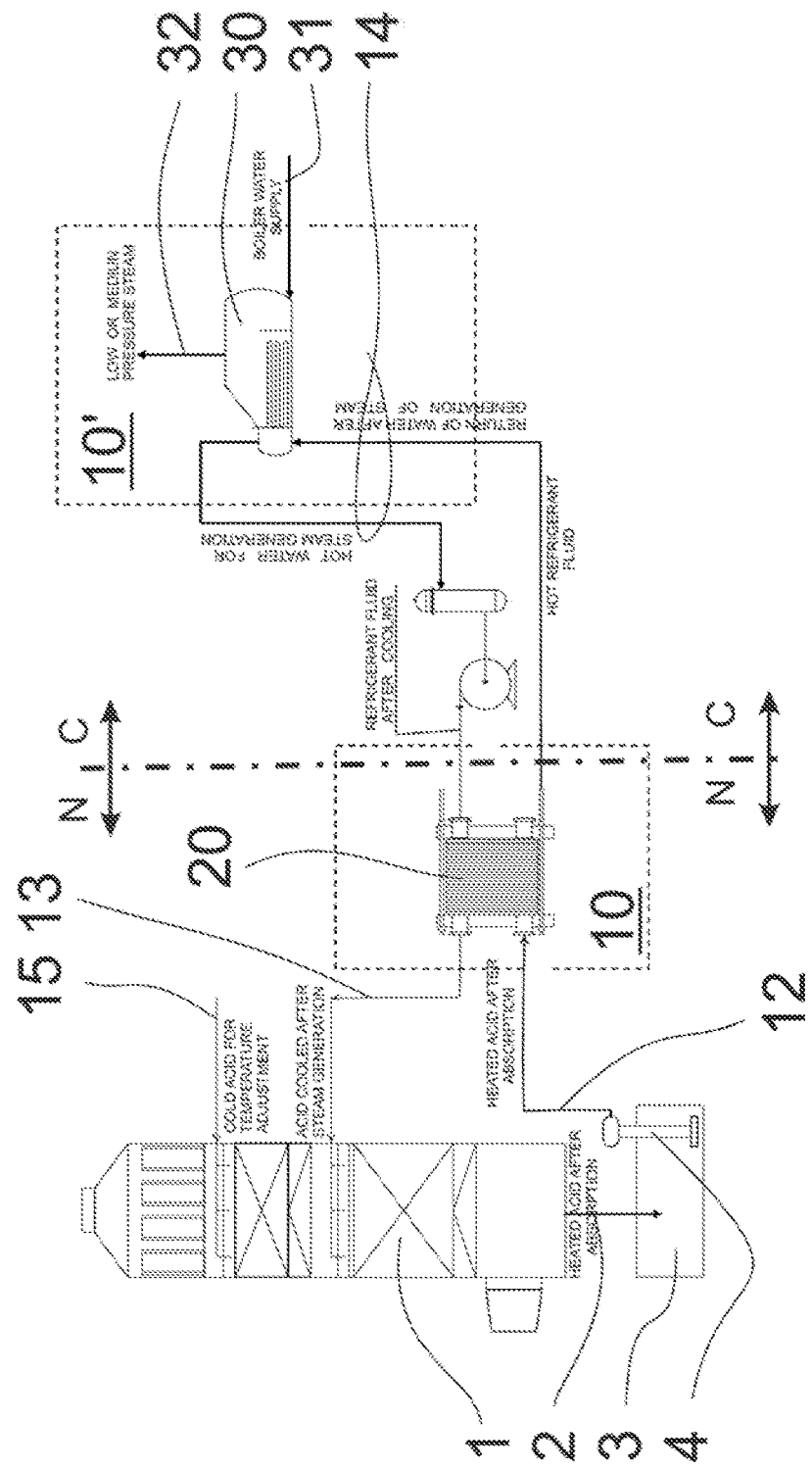
FIG. 6 shows a scheme of one embodiment of the indirect sulfuric acid cooling system with energy recovery, steam generation, according to this invention.

Another aspect relating to this invention refers to the fact that because of the contact with the acid, the heat exchanger 20, tubings and other components of the acid cooling loop associated therewith are made of more noble, and thus more costly materials, to resist this contact. The second heat exchanger (fluid/water) 11, the boiler 30 and other components associated therewith that have no contact with the acid may be made of a less noble and less expensive material, and, accordingly, particularly the heat exchanger 11 and the boiler 30 can be constructed with a larger area for thermal exchange to recover more energy, which is also an advantage of the system. This is shown in FIG. 6 by arrow N facing the region of the equipment that contacts the acid, particularly indicating that the heat exchanger 20 and the tubing associated therewith are made of noble material, and arrow C facing the region of the equipment that does not contact the acid but the coolant, particularly the heat exchanger 11, the boiler 30 and components associated therewith that may be built from conventional materials.

Another interesting aspect is that in a situation of failure of the boiler 30, provided there is an option to deviate the heat from the system to a cooling tower, for example, the system may continue to operate at energy recovery temperatures or temperatures of units having no energy recovery.

The system shown in FIG. 5 may be built in a simpler way without the second fluid-water heat exchanger 11, and provide only one acid-fluid heat exchanger 20 (FIG. 6) and the boiler 30. In this case, the coolant itself is used to generate steam. Therefore, the boiler 30 may be built to approach higher temperatures, such as for example 10° C. instead of 20° C. in order to generate a better quality steam (using a fluid that enters the boiler at 235° C. and exits at 215° C.) that enables achieving pressures in the order of up to 1800 kPa, unlike the 1200 kPa that would have been achieved with the conventional arrangement.

In this case the equipment substantially comprises (FIG. 6) a $SO_3$ absorption tower assembly 1; its outlet 2, acid circulation tank 3 and pump 4; acid cooling loop 10 consisting of a feeding tube 12 deriving from the pump 4; a shell and tube, plate or spiral acid-fluid heat exchanger 20 with which the tubing 12 connects; cooled acid recirculation tubing 13, which establishes a fluid connection between the heat exchanger 20 and the tower 1; energy recovery loop 10' consisting of a boiler 30 and feed and return tubing 14 arranged between the boiler and the heat exchanger 20, which includes an accumulation tank and booster pump. The shell and tube, plate or spiral acid-fluid heat exchanger 20 is built from noble materials and all other devices deriving therefrom, such as the boiler 30 and others are built from conventional materials, such as: carbon steel, 304 stainless steel, 316 stainless steel and the like. Since the boiler 30 is made from a less noble material, it can be built with a larger thermal exchange area to recover more energy.

While the embodiment without the second heat exchanger 11 as described and shown in connection with FIG. 6 improves a little the quality of the energy recovered and decreases the total installation cost, the system with the second heat exchanger 11 shown in FIG. 5 has the advantage of providing greater safety (even if acid leaks to the coolant loop it still does not expose the boiler to risks because of the intermediate heat exchanger, in this case the second heat exchanger 11).

Another advantage of a system comprising an intermediate heat exchanger is the possibility of recovering part of the energy as high pressure steam.

On the other hand, many sulfuric acid plants have high pressure steam generation obtained by cooling the sulfur furnace and catalytic beds. In these conditions, steams at a pressure of 3000 kPa, 4000 kPa and 6500 kPa are usual.

Figure 7:
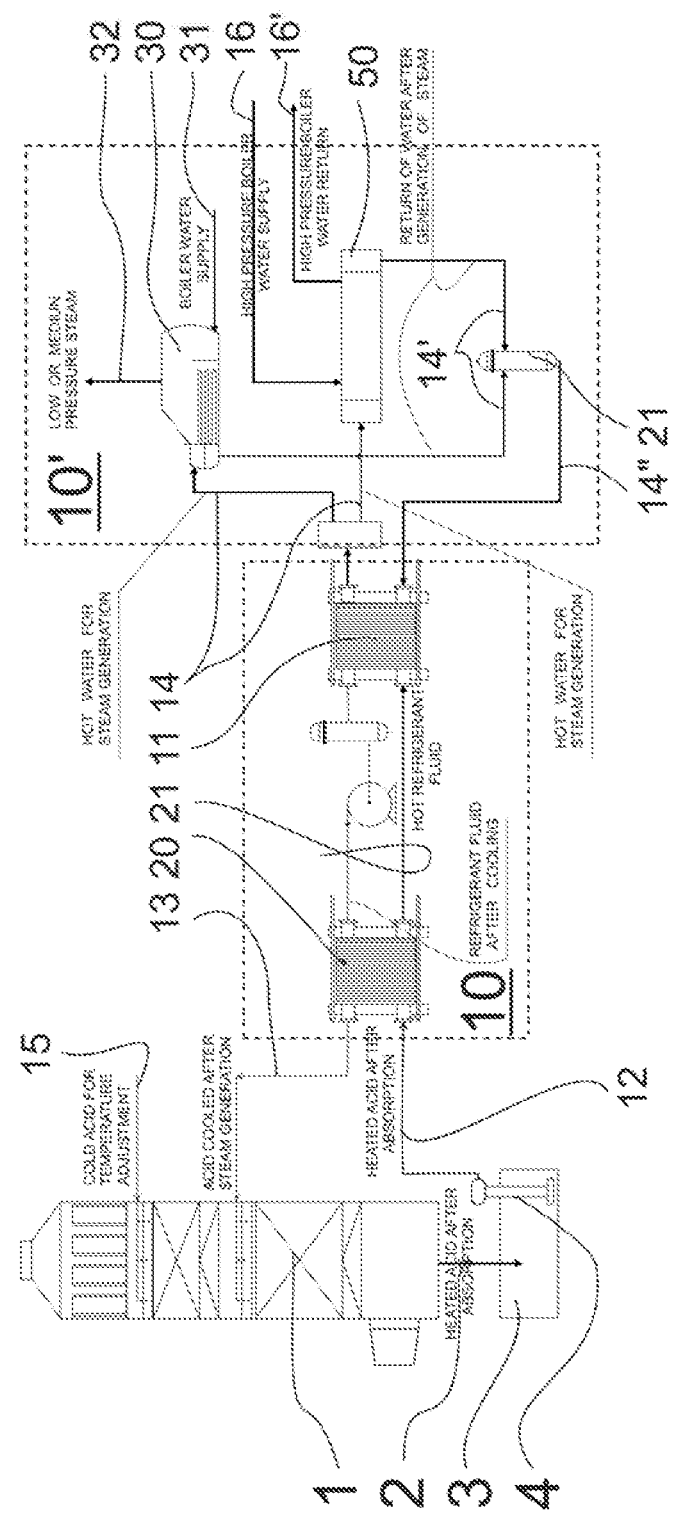
FIG. 7 shows a system with an intermediate heat exchanger that heats more than one user, according to the invention.

The method and equipment of the present invention may provide embodiments contemplating such situation, because the invention provides an intermediate heat exchange which makes it possible to divert part of the water preheated by the water-flowing heat exchanger to a pre-heater for the water from the boiler of the high-pressure system. FIG. 7 shows an embodiment according to which a plant with an intermediate heat exchanger and heating for more than one user is provided.

As an example of this case based on a commercial situation, the user is expected to have an acid plant with an approximate capacity of 1000 t/day. From the heat produced in the sulfur furnace and catalytic reactors, this plant should produce approximately 50,000 kg/hr of overheated steam at 4200 kPa and 450° C., a total energy applied to the steam (assuming heating from a boiler water at 100° C. and 4200 kPa) in the order of 40 MW.

On the other hand, during absorption of $SO_3$ by concentrated acid, this plant produces an energy of approximately 11 MW, which in a conventional unit is rejected together with the cooling water.

In units with traditional energy recovery, i.e. low or medium pressure steam directly generated in a boiler, the approximately 11 MW would produce approximately 20,000 kg per hour of steam at 800 kPa and 180° C., for example. If this unit had an indirect cooling system, part of this energy could be used to increase the generation of high pressure steam while the surplus would continue to generate low or medium pressure steam.

Thus, the plant according to the invention as shown in FIG. 7 comprises an absorption tower assembly consisting of single or double stage $SO_3$ absorption tower 1; its outlet 2 through which the heated acid circulates after absorption at a temperature between 100 and 240° C.; acid circulation tank 3 and pump 4.

The plant further comprises an acid cooling loop 10 comprising an intermediate acid-fluid heat exchanger 20; a second fluid-water heat exchanger 11, both of shell and tube, plate or spiral type; feeding tube 12 that establishes the fluid connection between the pump 4 and the intermediate acid-fluid heat exchanger 20, through which the heated acid circulates after absorption at a temperature between 100 and 240° C., and a concentration between 97 and 101%; cooled acid recirculation tubing 13 between the intermediate acid-fluid heat exchanger 20 and single or double stage $SO_3$ absorption tower 1 through which the cooled acid circulates after absorption at a concentration between 97 and 101%, and a temperature between 100 and 240° C.; inert coolant reuse tubing 21, which establishes a fluid connection between the intermediate acid-fluid heat exchanger 20 and the second fluid-water heat exchanger 11, and substantially comprising a tubing, an accumulation vessel and recirculation pump, through which, in one line, the heated fluid circulates and in the other the cooled fluid.

Finally, the plant comprises an energy recovery, steam generation loop, means for pre-heating the water from the boiler of the high pressure system 10 comprising a steam generation boiler 30, a boiler water pre-heater 50, a tubing 14 exiting the second heat exchanger 11 and entering the boiler 30 and the boiler water pre-heater 50, through which the hot water circulates for steam generation; return tubing 14' exiting the boiler 30 and the boiler water pre-heater 50, which connects with an accumulator vessel 21, and through which the cooled water circulates after steam generation through tubing 14", which exits the accumulating vessel 21 and enters the second heat exchanger 11, through which the cooled water circulates; tubing 31 for supplying water to the boiler at a pressure between 300 and 3500 kPa; 300-1500 kPa low and medium pressure steam tubing 32 exiting the boiler 30 and that can be supplied to any system; feeding 16 and return 16' tubing connected with the pre-heater for the water from the boiler 50, through which the water from the boiler circulates at a pressure of 2000-6500 kPa.

The plant further comprises a cold acid feeding tube 15 for temperature adjustment in tower 1, which feeds acid at a concentration between 97 and 101% and a temperature between 70 and 120° C.

Without considering the advantage of better reaching the temperatures by means of a plate, shell and tube or spiral heat exchanger compared to the temperatures obtained by a boiler, and further generating 11 MW in the hot acid absorption, one could route approximately 1.5 MW to high pressure steam, thus generating low or medium pressure steam with a smaller amount of energy of approximately 9.5 MW.

This embodiment is shown in FIG. 8 where a system with an intermediate heat exchanger for heating more than one user 70 with approximate values for a plant of 1000 t/day is seen. FIG. 8 shows an embodiment of the equipment with two plate heat exchangers and FIG. 8A shows an embodiment comprising a plate heat exchanger and another comprising a shell and tube heat exchanger.

This embodiment can only be used to generate medium or low pressure steam, or according to another arrangement, to include more users, such as for example, for heating phosphoric acid, for heating water for industrial or collective use or heating thermal fluids.

According to the basic embodiments disclosed herein, it is contemplated that the method and equipment object of the present patent may be subject to changes in materials, sizes, functional and/or ornamental configuration without departing from the scope of protection claimed.

In such regard, the sulfuric acid-inert coolant is preferably in the liquid phase at the operating temperatures; it is chemically and thermally stable, not combustible or flammable, has good chemical compatibility with metals and plastics, has low steam pressure at operating temperatures, is nearly insoluble in water and preferably minimally toxic or non-toxic. Said sulfuric acid-inert coolant comprises the family of perfluorocarbons, fluorinated hydrocarbons of chains with more than 5 carbon atoms, for example hydrofluoroethers or perfluoropolyethers or mixtures thereof or the like in their various degrees of polymerization and fluoridation.

For the equipment comprising two heat exchangers, both can be of the same type, i.e. plate (FIGS. 5, 7, 8) or shell and tubes (FIG. 2, 5 A) or spiral heat exchanger or the equipment may comprise two different types of heat exchangers working together as shown, for example, in FIG. 8A, all of that for design convenience.

The equipment may comprise an assembly or kit to be set up in an existing plant, consisting of a heat exchanger preferably mounted upwards the heat exchanger already existing in the plant such that it comprises the $SO_3$ absorption tower and first and second heat exchangers according to the present invention. Optionally, the new heat exchanger may be mounted upwards the heat exchanger already existing in the plant, as desired.

The kit further comprises a sulfuric acid-inert coolant load that cooperates with the first heat exchanger sandwiched between the $SO_3$ absorption tower and the second heat exchanger, using water or other fluid as coolant, according to the invention. Accordingly, the plant comprises the $SO_3$ absorption tower, the first acid-fluid heat exchanger, preferably part of the kit, and the second inert coolant-water or other fluid heat exchanger, preferably the one existing in the plant.

FIGS. 9 to 11 are schemes showing the optional heat exchangers used in the equipment of the invention.

FIG. 9 is a scheme showing a coolant-water plate heat exchanger 20, on one side, comprising an inlet for the heated acid after $SO_3$ absorption, and an outlet for the cooled acid for $SO_3$ absorption, and on the opposite side, an outlet for the heated coolant and an inlet for the cooled coolant.

FIG. 10 is a scheme showing a coolant-water shell and tube heat exchanger 20 having on the left, an inlet for the heated acid from the absorption of $SO_3$, and on the right, an outlet for the heated coolant and an outlet for the cooled acid for absorption of $SO_3$ and an inlet for the cooled coolant.

FIG. 11 is a scheme showing a coolant-water spiral heat exchanger having on one side an inlet for the heated acid from the absorption of $SO_3$, and above an outlet for cooled acid for absorption of $SO_3$, on the opposite side, an outlet for heated coolant and on the upper side, an inlet for the cooled coolant.

The invention claimed is:

1. A method for cooling sulfuric acid, wherein the method is part of a contact process for producing sulfuric acid ($H_2SO_4$), the method comprises the following steps:
   (A) absorption of ($SO_3$) sulfur trioxide by means of a stream of concentrated sulfuric acid in a column or liquid gas contact device, which produces a heated concentrated sulfuric acid effluent; and
   (B) indirectly cooling of the heated concentrated sulfuric acid effluent from the sulfur trioxide ($SO_3$) indirect absorption step (A) by means of heat exchangers using a sulfuric acid-inert coolant; an comprises:
      (B1) indirectly cooling of the sulfuric acid with an acid-inert coolant, which provides indirect heat exchange between the heated concentrated sulfuric acid effluent and the inert coolant, thus generating cooled sulfuric acid that is recirculated to the sulfur trioxide ($SO_3$) absorption step (A) and generating heated inert coolant with sulfuric acid; and
      (B2) second indirect cooling of the indirectly heated inert coolant with water or a further cooling fluid that provides indirect exchange of heat between the heated inert coolant and the water or further fluid, thus generating a coolant inert to the cooled sulfuric acid that is recirculated, and generating a water or further heated fluid capable of being cooled, recirculated or reused.

2. The method according to claim 1 wherein the sulfuric acid-inert coolants are fluorinated hydrocarbons or fully or partially fluorinated perfluorocarbons of polymer chains with 5 or more carbon atoms.

3. The method according to claim 2, wherein the inert coolants are selected from the group consisting of: hydrofluoroethers, perfluoropolyethers, mixtures thereof and the like.

4. A system for cooling sulfuric acid wherein said system performs the method of claim 1, said system comprising:
   a sulfur trioxide ($SO_3$) absorption tower (1),
   a tower outlet (2) through which heated concentrated sulfuric acid effluent circulates;
   a hot concentrated sulfuric acid circulation tank (3) and pump (4);
   an acid cooling loop (10), the acid cooling loop comprises:
      an intermediate acid-fluid heat exchanger (20), which cools the concentrated hot sulfuric acid through a thermal exchange with inert coolant is established;
      a second fluid-water heat exchanger (11), which receives and cools heated inert coolant through a thermal exchange with cooling water;
      a feeding tube (12), which establishes a fluid connection between the pump (4) and the intermediate acid-fluid heat exchanger (20);
      a cooled sulfuric acid recirculation tubing (13) to the sulfur trioxide ($SO_3$) absorption tower (1);
      tubing (21) for reuse of the inert coolant that establishes a fluid connection between the intermediate acid-fluid heat exchanger (20) and the second fluid-water heat exchanger (11), and comprising a tubing, an accumulation vessel and recirculation pump; and
      return and water supply tubing (14) for the second fluid-water heat exchanger (11).

5. The system according to claim 4, comprises an assembly or kit that can be set up in an existing plant having the sulfur trioxide ($SO_3$) absorption tower and at least one heat exchanger mounted upwards, the kit comprising a sulfuric acid-inert coolant load that cooperates with one of the at least one heat exchanger, wherein one of at least one heat exchanger being a first acid-fluid heat exchanger and a second at least one heat exchanger being a fluid-water coolant heat exchanger.

6. A method for cooling sulfuric acid wherein the method is part of a contact process for producing sulfuric acid ($H_2SO_4$) including energy recovery, the method comprises the following steps:
   (A) absorption of sulfur trioxide ($SO_3$) by means of a stream of concentrated sulfuric acid in a column or liquid gas contact device which produces a heated concentrated sulfuric acid effluent;
   (B) intermediate indirect cooling of the heated concentrated sulfuric acid effluent from the sulfuric acid ($SO_3$) indirect absorption step (A) by means of heat exchangers; and comprising:
      (B1) indirectly cooling of sulfuric acid using an acid-inert coolant providing a heated coolant containing sulfuric acid and a cooled sulfuric acid, and
      (B2) indirectly cooling of the heated coolant using water or further fluid providing a cooled coolant and heated water or further fluid,
   (C) recovering energy or generating steam by indirect cooling of the heated water or other fluid from the second coolant-water cooling step B2 in a steam generation boiler or steam generation boiler and heat exchanger.

7. The method according to claim 6 wherein the sulfuric acid-inert coolants are fluorinated hydrocarbons or fully or partially fluorinated perfluorocarbons of polymer chains with 5 or more carbon atoms.

8. The method according to claim 6, wherein the inert coolants are selected from the group consisting of: hydrofluoroethers, perfluoropolyethers, mixtures thereof and the like.

9. The system for cooling sulfuric acid wherein said system performs the method of claim 6, wherein the system with energy recovery, further comprising
   sulfur trioxide
   a $SO_3$ absorption tower (1), a tower outlet (2) through which the a heated concentrated sulfuric acid effluent circulates; a hot concentrated sulfuric acid circulation tank (3) and a pump (4); an acid cooling loop (10); and an energy recovery cooling, a steam generation loop (10')
   wherein the acid cooling loop (10) comprises:
      an intermediate acid-fluid heat exchanger (20);
      a second fluid-water heat exchanger (11), being a shell and tube, a plate or a spiral heat exchanger;
      a feeding tube (12) which establishes a fluid connection between the pump (4) and the intermediate acid-fluid heat exchanger (20);
      a cooled acid recirculation tubing (13) between the intermediate acid-fluid heat exchanger (20) and single or double stage sulfur trioxide ($SO_3$) absorption tower (1);
      a tubing (21) for reuse of the inert coolant, which establishes the fluid connection between the intermediate acid-fluid heat exchanger (20) and the second fluid-water heat exchanger (11), and comprising tubing, an accumulation vessel and a recirculation pump; the energy recovery, steam generation loop (10')
   consisting of a steam generation boiler (30);
   feed and return tubing (14) between the second heat exchanger (11) and the boiler (30); and
   a tube for supplying water (31) to the boiler.

10. The system according to claim 9, wherein the acid cooling loop (10) comprises:
the feeding tube (12) derived from the pump (4);
a shell and tube, plate or spiral acid-fluid heat exchanger (20) with which the tubing (12) connects;
a cooled acid recirculation tubing (13), which establishes a fluid connection between the heat exchanger (20) and the tower (1); and
an energy recovery loop (10') comprising a boiler (30) and feed and return tubing (14) arranged between the boiler and the heat exchanger (20), which includes an accumulation tank and booster pump such that the inert coolant itself cooperates with the boiler (30) in steam generation.

11. The system according to claim 9 providing the energy recovery, steam generation loop, wherein the system comprises:
a steam generation boiler (30);
a boiler water pre-heater (50);
a tubing (14) exiting the second heat exchanger and entering the boiler (30) and the boiler water pre-heater (50) through which hot water for steam generation circulates;
a return tubing (14') exiting the boiler (30) and the boiler water pre-heater (50) connecting with an accumulation vessel (21) through which cooled water circulates after steam generation;
a tubing (14") exiting the accumulation vessel (21) and an inlet in the second heat exchanger (11) through which the cooled water circulates;
a tubing (31) for supplying water to the boiler;
low or medium pressure steam tubing (32) exiting the boiler (30) and that may be fed into any system; and
feeding (16) and return (16') tubing connected with the boiler water pre-heater (50) through which the high pressure boiler water circulates.

* * * * *